United States Patent
Casimaty et al.

(10) Patent No.: US 6,171,019 B1
(45) Date of Patent: Jan. 9, 2001

(54) METHODS OF, AND APPARATUS FOR, MIXING AND PREPARING A BASE ON WHICH TURF IS TO BE LAID

(75) Inventors: Gabriel (Bill) Casimaty; Lee Simonis; Ronald John Lowry, all of Seymour (AU)

(73) Assignee: StrathAyr Pty. Limited, Seymour (AU)

( * ) Notice: Under 35 U.S.C. 154(b), the term of this patent shall be extended for 0 days.

(21) Appl. No.: 08/836,906

(22) PCT Filed: Nov. 6, 1995

(86) PCT No.: PCT/AU95/00737

§ 371 Date: Jun. 20, 1997

§ 102(e) Date: Jun. 20, 1997

(87) PCT Pub. No.: WO97/01149

PCT Pub. Date: Feb. 26, 1987

(30) Foreign Application Priority Data

Nov. 4, 1994 (AU) ................................................ PM9228

(51) Int. Cl.⁷ .................................................. G01C 11/22
(52) U.S. Cl. ............................................. 404/98; 404/105
(58) Field of Search ............................... 404/75, 105, 98, 404/110; 249/2, 4; 172/19

(56) References Cited

U.S. PATENT DOCUMENTS

| | | | |
|---|---|---|---|
| 3,175,478 | * | 3/1965 | Smith ...................................... 404/98 |
| 3,261,272 | * | 7/1966 | Jennings, Jr. .......................... 404/98 |
| 3,363,524 | * | 1/1968 | Catenacci ............................. 404/105 |
| 3,733,140 | * | 5/1973 | James, III ............................... 404/98 |
| 3,733,141 | * | 5/1973 | James, III ............................... 404/98 |

(List continued on next page.)

FOREIGN PATENT DOCUMENTS

| | | |
|---|---|---|
| 2339625 | 6/1926 | (AU) . |
| 6602785 | 6/1987 | (AU) . |
| 4434689 | 5/1990 | (AU) . |
| 7623591 | 4/1992 | (AU) . |
| 3106493 | 7/1993 | (AU) . |
| 2457055 | 6/1975 | (DE) . |
| 0385017 | 9/1990 | (EP) . |
| 2118412 | 11/1983 | (GB) . |
| 2157533 | 10/1985 | (GB) . |
| 3199503 | 8/1991 | (JP) . |
| 3199504 | 8/1991 | (JP) . |
| 6153684 | 6/1994 | (JP) . |
| 8701149 | 2/1987 | (WO) . |
| 8808054 | 10/1988 | (WO) . |
| 9100392 | 1/1991 | (WO) . |

Primary Examiner—Eileen D. Lillis
Assistant Examiner—Raymond W Addie
(74) Attorney, Agent, or Firm—Edwin D. Schindler

(57) ABSTRACT

An apparatus, and related method, for laying sand and/or a sand reinforcement matrix onto a pre-prepared surface, includes an apparatus having a hopper for providing a matrix to be laid, a plunger at the forward end, in the sense of direction of movement of the apparatus, of the hopper and an element for reciprocating the plunger for taking material from the hopper and delivering it through an extrusion aperture in the rear thereof to an extrusion mold. The extrusion is effected by moving forwardly as pressure is applied to the matrix to be extruded and as the mold passes over the matrix. The extrusion of a sand, or a sand reinforcement, is compacted in the extrusion by using the weight of the apparatus against which the extrusion plunger acts together with the impaction of previously extruded material. The plunger moves forwardly so that material in the hopper can fall in front of the plunger; the plunger is moved rearwardly causing this material to move into the extrusion mold until compaction commences to take place, at which time compaction is increased until the pressure on the plunger is sufficient to physically cause the apparatus to move.

10 Claims, 5 Drawing Sheets

U.S. PATENT DOCUMENTS

| | | | | |
|---|---|---|---|---|
| 3,893,780 | * | 7/1975 | Gutman et al. | 404/91 |
| 3,915,584 | * | 10/1975 | Coho, Jr. et al. | 404/98 |
| 4,145,155 | * | 3/1979 | Ogaki et al. | 404/98 |
| 4,712,919 | * | 12/1987 | Bouldin | 366/139 |
| 4,789,266 | * | 12/1988 | Clarke, Jr. et al. | 404/96 |
| 4,802,788 | * | 2/1989 | Smith | 404/94 |
| 4,944,631 | * | 7/1990 | Egli | 404/91 |
| 5,059,062 | * | 10/1991 | Bresnahan | 404/110 |
| 5,062,737 | * | 11/1991 | Samuels | 404/98 |
| 5,129,462 | * | 7/1992 | Mail | 172/19 |

\* cited by examiner

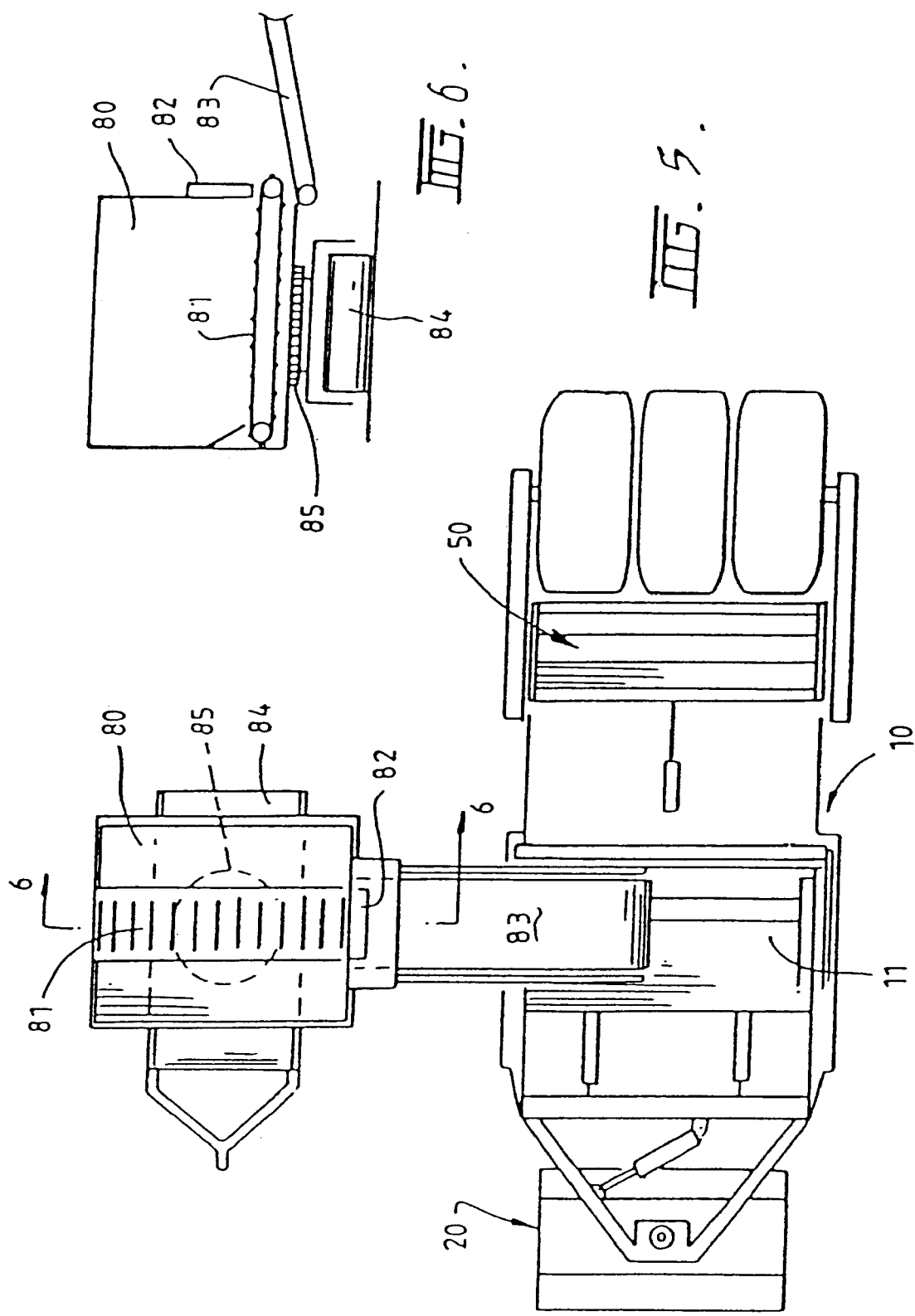

METHODS OF, AND APPARATUS FOR, MIXING AND PREPARING A BASE ON WHICH TURF IS TO BE LAID

This application is the U.S. national phase of PCTAU 95/00737, filed Nov. 6, 1995.

BACKGROUND OF THE INVENTION

This invention relates to methods and apparatus for laying turf and, in particular, to methods of and apparatus for forming the base on which turf is to be laid and is specifically adapted for forming bases on which previously washed turf can be laid.

The applicant has adopted and developed systems whereby turf can be grown and harvested, and the soil from the root zone of the turf can then be removed by washing, and subsequently this turf can be relocated on a growing medium which is preferably sand. It can, however, be a sand/soil mixture, sand/peat moss or even soil alone. For the purposes of this description, we shall refer to the medium as sand on the understanding that it can be any one of the above.

In preferred forms, the growing medium has a base including drainage, a thickness of sand located thereabove, and a further thickness of sand which has reinforcing material therein. This sand/reinforcing material can be referred to as a matrix.

We prefer to use, as a reinforcing material, plastic mesh elements such as those sold under the trade mark Netlon but other elements, including fibrous elements can be used. Some such elements are sold under the trade marks Turfgrids, Fibresand and Fibreturf.

A substantial difficulty of such systems has been to satisfactorily lay the upper, reinforced, layer of sand. When there is a mixture of same and the Netlon elements, if a machine which acts on the surface is used, this tends to distort the surface as the edges of some of the elements can be contacted by the blade and this will tend to force the elements and the surrounding sand out of their position in the ground. Further, if a grader type machine is being used, if part of an element is being moved, it will tend to carry the adjacent sand with it.

SUMMARY OF THE INVENTION

It is the first object of the present invention to provide an apparatus which can readily lay the upper, reinforced, layer of sand in an application where turf is to be laid.

A second aspect of the invention is to provide such an apparatus which includes means whereby an already laid layer of plain sand can be at least partially lifted, can be mixed with reinforcing material and can be re-laid to provide the required final surface.

A still further object of the invention is to provide in such a machine, means whereby reinforcing material can be provided either in pre-prepared elements or in the form of a web, which may be a broadloom web, which is cut into the required sizes and added to the sand.

A still further object is to provide such an apparatus which can lay turf while it moves.

A still further object is to provide an apparatus which can deliver a mixture of sand and reinforcing elements to a paving apparatus while that machine is in operation.

In accordance with the broadest aspect of the invention, we provide an apparatus for laying sand and/or a sand/reinforcement matrix onto a pre-prepared surface, which apparatus includes a hopper to provide the matrix to be laid, a plunger at the forward end, in the sense of the direction of movement of the apparatus, of the hopper and means whereby the plunger can be reciprocated to take material from the hopper and deliver it through an extrusion aperture in the rear thereof to an extrusion mould, the extrusion being effected by the machine moving forwardly as pressure is applied to the matrix to be extruded and the mold passes over the matrix. The apparatus may be provided with a secondary hopper so that any unevennesses in the surface of the material extruded can be removed by adding sand thereto as it is about to leave the apparatus.

In the second aspect of the invention, the apparatus has means whereby material can be removed from a previously prepared sand surface, the material can be mixed with a reinforcing material and the matrix of sand and reinforcing material is then feed to the hopper for re-delivery to the surface.

In this aspect of the invention, we may simply add to the material being removed pre-prepared reinforcing elements or the like and preferably pass these through a mixing process or, alternatively, we could supply the reinforcing material in a web or the like and provide cutting means whereby this can be cut into the required size shortly before it is added to the removed material.

The invention also includes an apparatus for mixing of this general type which is not associated with the laying apparatus.

In a still further aspect of the invention, we provide means at the rear of the apparatus to hold turf to be laid, which may be adapted to hold a roll of turf from which the growing medium has been removed and we may also provide means to provide a top dressing over the turf as it is delivered.

In a still further aspect of the invention, we provide a delivery apparatus which can be adapted to be towed by a prime mover and which has a hopper adapted to hold a matrix of sand and reinforcing material and a conveyor in the floor of the hopper which extends outwardly along one side thereof and which is adapted to be located over the hopper of the apparatus which extrudes the material.

In a preferred form, the apparatus above described can have its hopper mounted on a turn table or the like so that it can deliver material to the hopper from either side thereof.

The invention also relates to methods of laying and sand/reinforcement matrices over a surface. This can be done by adding a sand layer to a base, which could be aggregate or the like which is adapted to drain the surface or it could be a pre-laid sand surface over which a matrix is laid.

The invention also includes a method of removing sand from a surface, adding reinforcement thereto to make a matrix and returning the sand to the surface.

The invention also includes methods of mixing sand with reinforcement and delivering sand and sand/reinforcement matrices to a working place.

In order that the invention may be more readily understood, we shall describe, in relation to the accompanying drawings, various forms of apparatus made in accordance with the invention, and their methods of operation.

BRIEF DESCRIPTION OF THE DRAWING FIGURES

In these drawings:

FIG. 5 shows a plan view of a delivery machine in position adjacent the paver to deliver matrix thereto; and FIG. 6 shows a section along line 6—6 of FIG. 5.

DETAILED DESCRIPTION OF THE DRAWING FIGURES AND PREFERRED EMBODIMENTS

Figure 1:
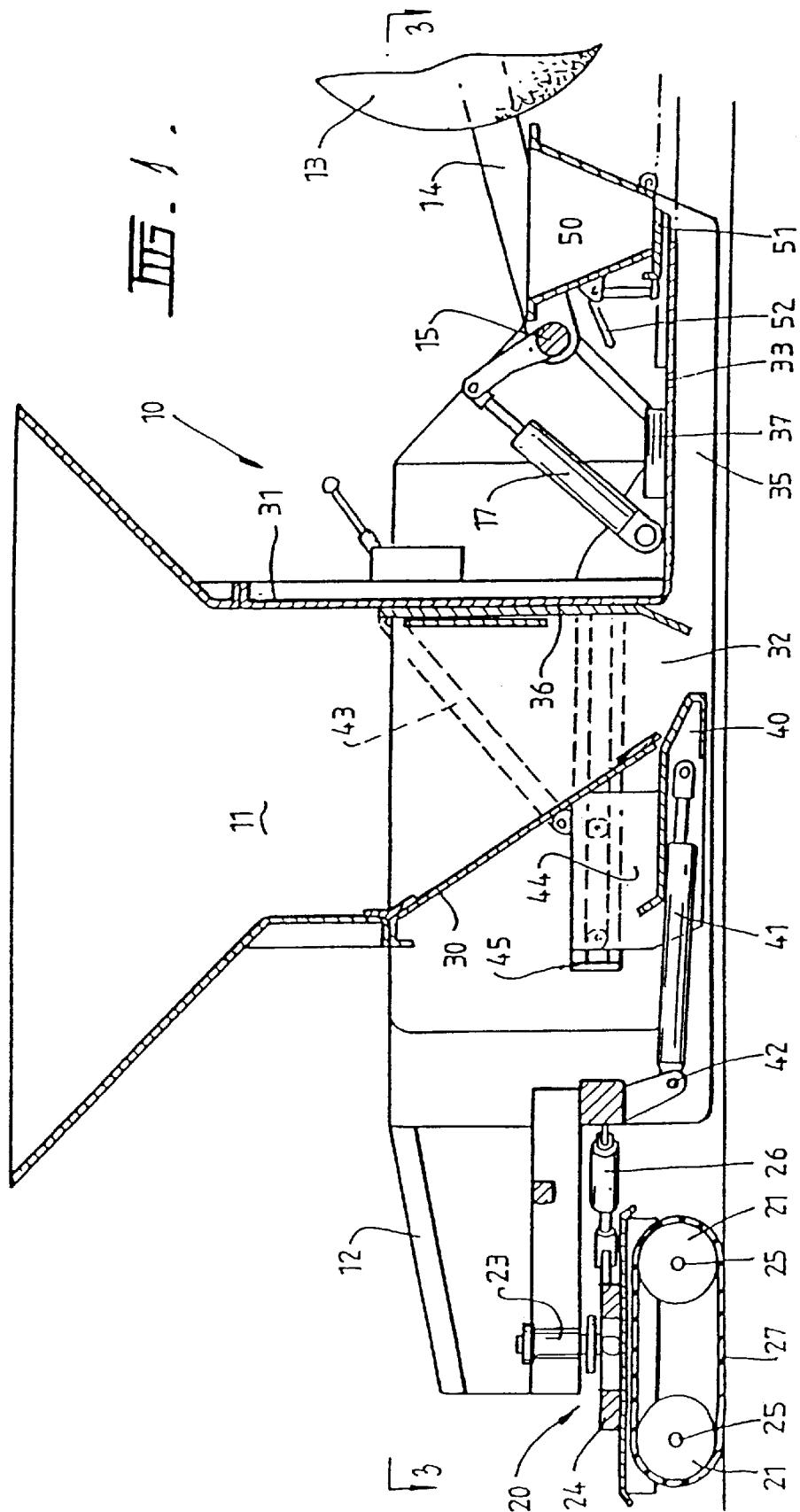
FIG. 1 shows a side view, partly in section of the apparatus as it is in a position to deliver material.

For convenience, the apparatus for laying material will be referred as a paver although, strictly, it lays a continuous layer of material.

The paver of the invention is adapted to place an even layer of material onto a substrate, and, for the purposes of this description, we shall consider the substrate as being sand, and the layer, a matrix of sand and Netlon mesh reinforcing elements, (although it could include any other reinforcing elements).

If required, the material could be a mixture of sand and soil, or just soil, it could contain a material such as peat moss which assists in water retention or it could be provided with no reinforcing material, or the reinforcing material could be other than Netlon elements, such as fibrous material.

It is essential that the paver provide a flat surface onto which, in our preferred application, washed turf can be placed.

The paver has a body 10 which has a hopper 11 shown substantially centrally therewith and which is adapted to receive the sand/mesh elements matrix.

Extending forwardly from the hopper, there may be a support mechanism 20 which carries steerable ground engaging rollers 21 which may be connected by tracks 22.

Such an arrangement is preferred to wheels in this application because these will be in contact with the prepared substrate and it is required that this be damaged as little as possible prior to the delivery of the matrix thereto as the drainage for the surface is dependent on a uniform layer of material.

As illustrated, there is a forwardly extending portion 12 of the body which has a bearing for a vertically mounted pivot assembly 23 which is connected to a sub-frame 24 which, in turn, carries the axles 25 about which the rollers 21 can rotate. As illustrated, there are two rollers with their axis normally transverse to the direction of movement of the paver with the rollers axes being parallel and one behind the other and the track or tracks 22 are located over the rollers.

The pivot assembly 23 is arranged to that the sub-frame 24 can be rotated thereabout and by the use of a ram 26, this can be steered.

As an alternative to using such an arrangement, we could use rollers alone as these would assist in the spreading of the load.

At the rear of the device, we may have road wheels 13 which are mounted on a sub-frame 14 which is pivotally connected to the body about pivot 15 and is associated with an hydraulic ram or the like 17 whereby the location of the wheels relative to the body can be varied.

These have two purposes. Firstly, when the paver is to be transported, the wheels can be positioned on the ground and the body 10 lifted and the paver towed from the other end.

In operation, the wheels 13 can give the paver its initial required height, until the first quantity of matrix is delivered, after which they are moved away from the surface, or could even be removed completely.

The hopper 11 extends across the width of the paver and at its forward end 30, at least, is tapered so that the sand/element matrix tends to fall to the bottom of thereof.

Adjacent the forward end 30 of the hopper, at the lower end thereof, there is an hydraulic ram operated plunger 40. The body 41 of the ram extends forwardly exteriorly of the hopper and is attached by pivot 42 to the body 10. In the lower portion of the rear wall 31 of the hopper, there can be an aperture 32 through which the contents of the hopper can be displaced.

Extending rearwardly from the top of this aperture, there is a plate 33, which comprises the upper wall of an extrusion mold, there being side walls 34,35 along each side of the plate 33. The arrangement is such that the matrix being moved rearwardly is confined by this mold.

Adjacent the rear wall 31 of the hopper, there is a moveable plate 36 which is adapted to move upwardly and downwardly relative to the rear wall, but closely adjacent thereto.

This plate ensures that the matrix in the hopper falls to the floor to ensure that the matrix fills the area in front of the plunger 40 so that there is sufficient material so that on rearward movement of the plunger 40, there is a full quantity of material available for movement.

This plate 36, or an alternative plate, can be provided to close the aperture 32 from the hopper when the paver is to be transported.

There is a linkage 43 which is connected to a plate 44, which is in connected with the plunger 40 and which moves along guides 45 attached to the exterior wall of the hopper and thus moves with the plunger 40 and which provides a generally up and down movement of the plate 36 on the forward and rearward movement of the plunger 40.

The arrangement is such that when the plunger 40 moves rearwardly, linkage 43 lifts and, in turn, causes the raising of the plate 36 and thus closing the opening of the aperture 32 in the rear of the hopper. When the plunger retracts, the linkage moves in the opposite direction and causes this plate to move downwardly to assist in the moving of the matrix to the bottom of the hopper behind the plunger so as to be available on the next rearward movement of the plunger.

Figure 2:
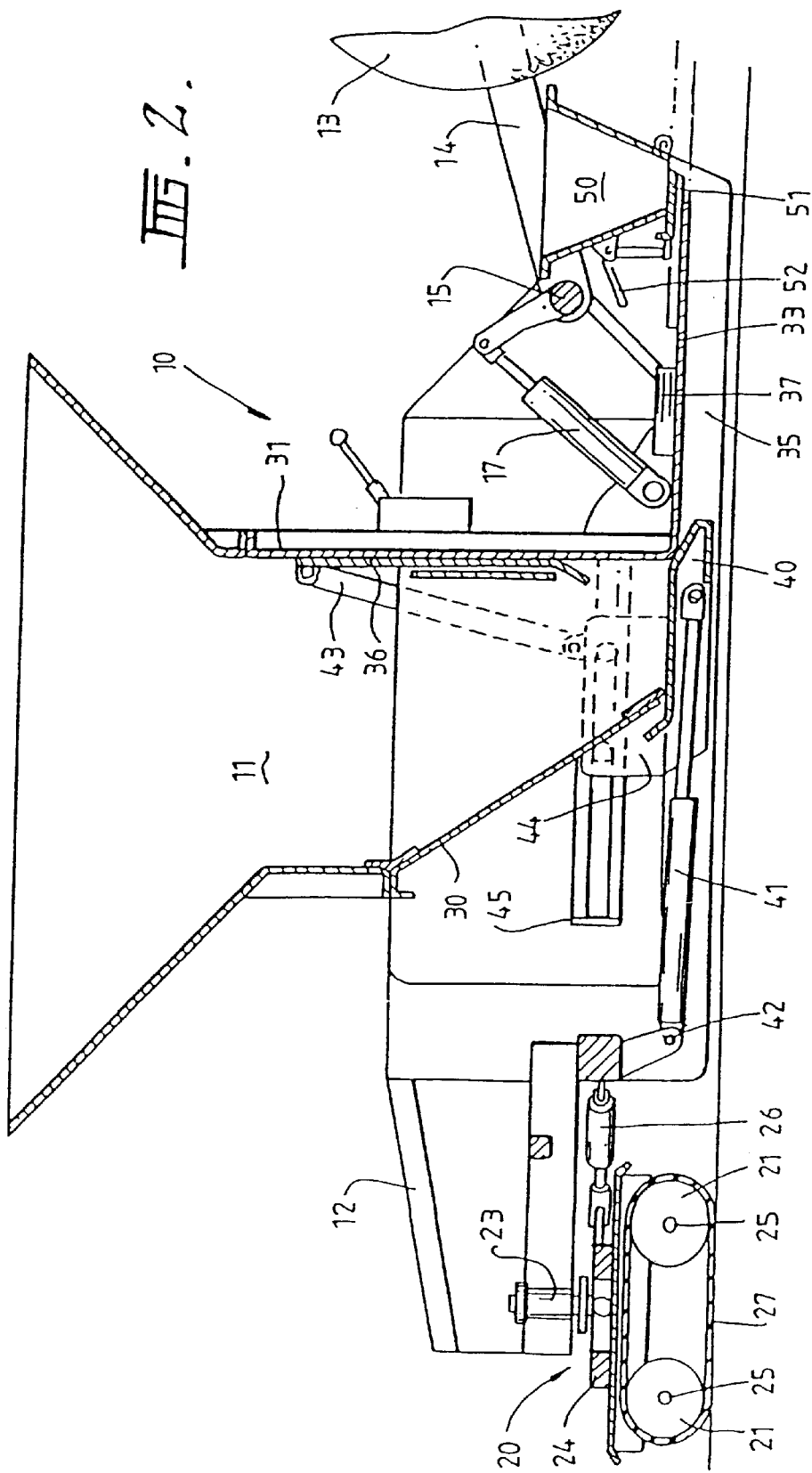
FIG. 2 shows a view, similar to that of FIG. 1, in which the delivery stroke is completed.
Figure 3:
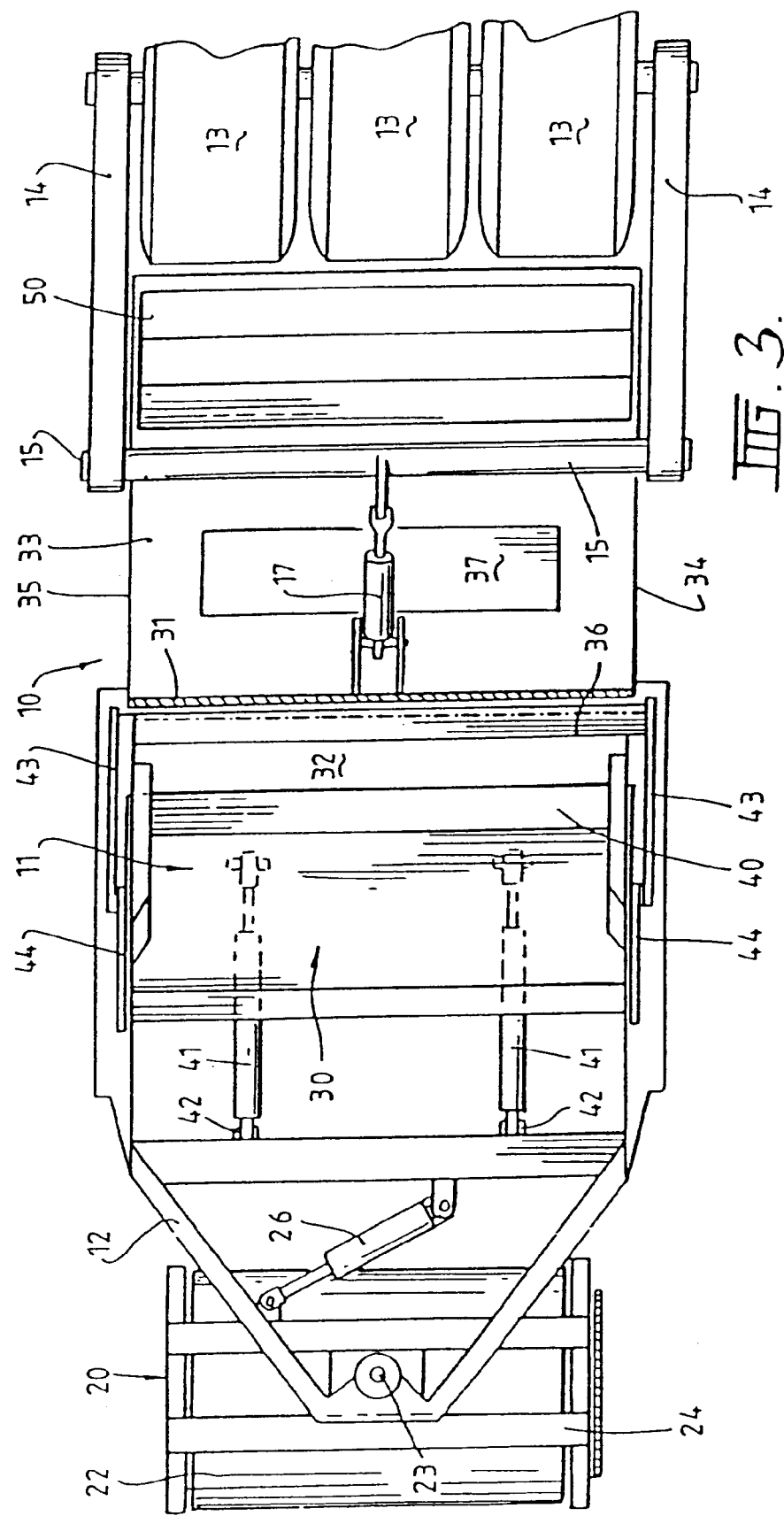
FIG. 3 is a view along line 3—3 of FIG. 1 showing the general arrangement of the apparatus.

More particularly, in the position of FIG. 1, there has already been some forward movement of the plunger 40, so that plate 44 has been lifted slightly from the floor of the hopper 11. It will be seen that the rollers in the guides 45 are not at their forward-most position in FIG. 1. On the other hand, in FIG. 2, plunger 40 is in its rearmost, as it has struck the edge of hopper 11.

Mounted on plate 33, which forms the upper surface of the mold and is in connection with the rear wall of hopper 11, to act, against at least the rear wall of the hopper, there is a vibrator 37 which assists in the movement of the matrix to the bottom of the hopper.

At the rear of the body, we may provide a further subsidiary hopper 50 which is adapted to receive only sand. This hopper may have a plate 51 which is connected by a bell crank to a handle 52 whereby the bottom of which may be opened or closed at will.

In operation, the paver is moved into the required position, if necessary by the use of its road wheels 13, and it is located at its required starting position.

If there has been no material laid, the wheels are adjusted so that the paver is the required height from the ground.

If this has not already been done, the main hopper 11 is filled with a sand/element matrix and the subsidiary hopper 50 is filled with sand.

The rollers 21 are adjusted to permit the paver to move in the required direction, and, basically, will only be used during operation if there tends to be a movement away from this.

When the device operates, the plunger would normally be in its forward most position, and the moveable plate. 36 at the rear of the hopper would close the aperture 32. The matrix in the hopper, both because of its loading and the vibration of the vibrator 36 would fill the lower portion of the hopper. The plunger 40 would move rearwardly, the plate 36 moves upwardly to expose the aperture 32.

This causes an initial rearward movement of the sand/element matrix into the mold.

Once the machine has started to pave the area, this rearward movement will be resisted by the already laid layer of sand/element matrix which is located behind the machine and further attempts to move the new material rearwardly will be resisted. The paver will then move forward as the material is expelled from the rear thereof.

When this occurs, the road wheels 13 can be moved out of position, or removed completely as they are no longer necessary for the operation of the paver.

The provision of vibration acts to ensure that the material, as it is leaving the paver, is compacted and there are no or few voids or surface imperfections.

Once the plunger 40 completes its rearward movement, it is retracted, further matrix material falls into the space left, the moving plate 36 and the vibrator 37 further assists this, and the operation is repeated.

This will again cause the paver to move forwardly and the compacted material will leave the rear of the paver.

The second smaller hopper 50 is set so that its opening is at the required level of material and acts to provide a filling if there are unevennesses in the surface of the material which leaves the paver.

In this operation, the sand/element mix is slightly damp so that it does have a natural cohesiveness and the paved area behind the paver is flat. Should there be any slight variations in the surface as contacted by the forward rollers or belt, this will largely be self corrected and the final surface will generally be more even than the initial surface.

It will be seen that where a substantial thickness of material is being paved, and 100 millimetres will be quite a common thickness and we could lay up to 350 millimetres, then there will be very substantial quantities of material being laid on the surface and there will be a necessity to continually load the main hopper.

Because the subsidiary hopper only applies very small quantities of material at any time, this will need far less regular attention.

When the machine ends a run, depending upon the surface which is being paved, several alternatives could be adopted.

The first is that the rollers front could be driven by an inboard hydraulic system, the paver could be steered by means of the ram 26 through a circle, re-aligned with the completed row, and then run down the area in the opposite direction.

The second is that the paver could be lifted by a crane or the like, physically rotated, and then located in the required position for the return run. The third is that the paver could again be lifted and, in this case, carried back to the position at which the previous paving run had started and placed in position so that it operates parallel to its initial direction of operation.

The best method of handling the paver, and indeed, the best method of obtaining most effective paving, that is whether it is all done in parallel runs or done with certain runs at right angles to others, will depend on the particular job being done and are not, as such, part of this invention.

It will also be seen that there are many possible modifications in the actual form of the paver, the most critical parts of the machine being in the delivery of the sand/element mix to the lower end of the hopper in such a way that material is extruded and the extruded material is basically fully dense.

The actual form of apparatus to provide this action can vary widely.

Also, although we have mentioned the use of rams, it is preferred that the device be generally hydraulically operated, but is preferably self contained so there may be a diesel or petrol engine to drive a pump to provide the hydraulic fluid under pressure and this can be used not only for the movement of the plunger 40, but also to effect movements of, say, the shutter 51 under the secondary hopper and, the rotation of the rollers 21 to permit the apparatus to move under its own power and, if required, the rotation of the road wheels 13 by the ram 17 to bring these into contact with the surface. Hydraulics can also be used to steer roller 21 and thus the belt 22 associated therewith.

The paver can, if required, be provided with a laser control means both for the direction of movement and the depth of material being delivered.

When the paver is to be self driven, this can be by a hydraulic motor or motors which are associated with roller 21.

We will describe hereinafter one preferred-method of loading the hopper, but various methods can be used.

It will be appreciated that it is preferred that the loading continue while the paver is moving as its overall rate of movement is not high and, to obtain maximum coverage, its movement must be disturbed as little as possible.

The device can be modified in two substantial ways to enable it to even further facilitate the laying of turf.

Firstly where, say, a sports field or race track is to be returfed, it is essential that the profile of the finished turf meets the requirements of the design.

This may be completely flat, sloping slightly outwardly from, say, a central point, to provide a camber or to be cambered from one side to another.

In practice, this has been very difficult to do where a substrate is first laid and then a matrix of sand and reenforcing elements are applied thereto, This difficulty has been partially overcome with the paver as previously described, but we may prefer to initially lay out the whole surface with sand with the profile being the required profile of the surface and having no re-enforcing therein.

This is relatively easy to work and laser controlled machines can be used to provide an extremely accurate upper profile.

Figure 4:
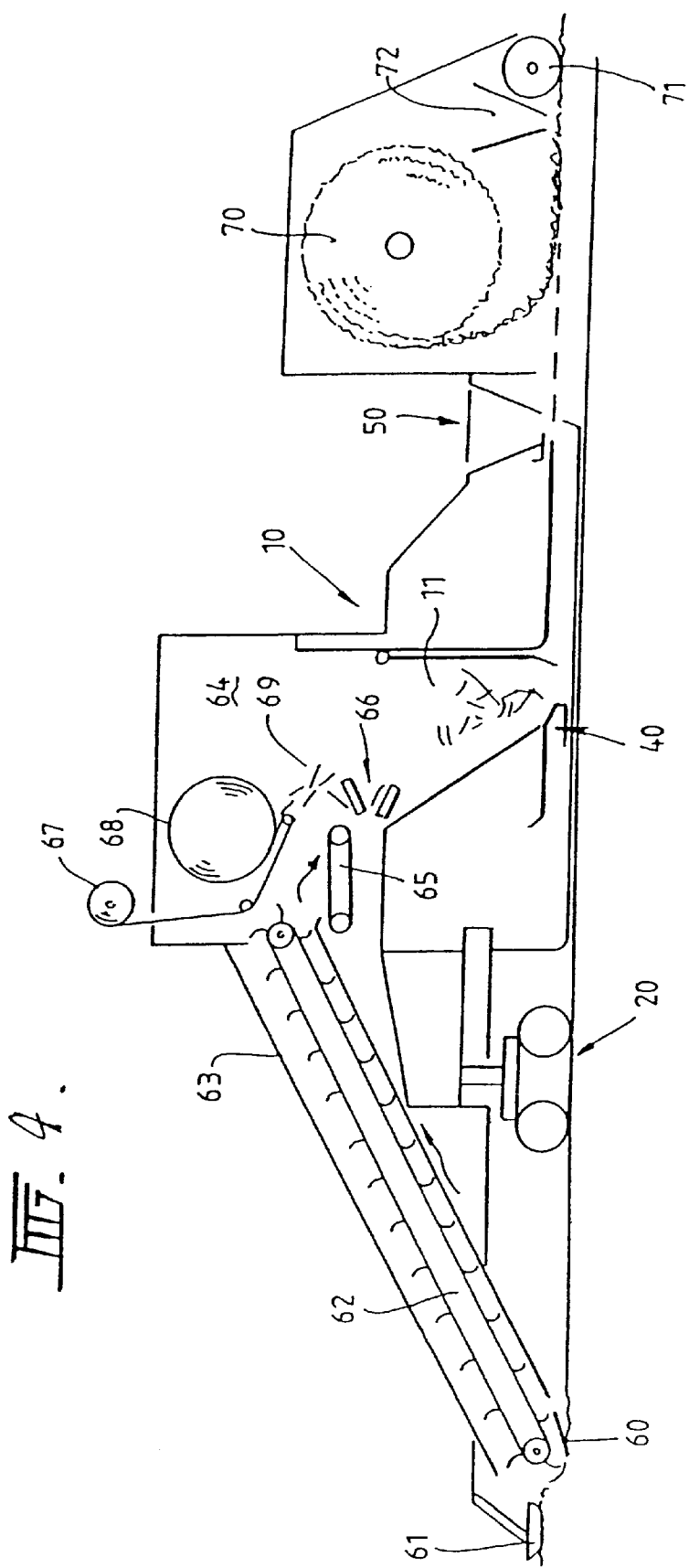
FIG. 4 shows a side view of a modified paver which can remove sand from in front of the machine, mix it with re-enforcing elements and return it to the hopper, and can also deliver turf from the paver.

As we have previously stated, the machine of the invention can closely follow a required profile, and in the first modification, illustrated in FIG. 4, we provide at the forward end of the paver a blade 60 which can cut through and remove the upper layer of sand. This blade may be associated with a foot 61 which can follow the surface of the completed, profile.

Associated with the blade 60 there is a conveyor 62, which may be located in a housing 63 and can draw the sand rearwardly and above the body 10 of the paver to a mixing station 69 in which it can be mixed with re-enforcing material 69.

The conveyor 62 is adapted to move at a speed the same as or slightly greater than the speed of forward movement of the paver. That is to say that the sand being delivered from the blade is carried up the conveyor without any congestion.

The re-enforcing material can be supplied in any required manner but, using mesh elements, these would normally be provided as individual elements which may be delivered from a roll of carrier material, which ensures that the elements are discrete when added. One satisfactory way of delivering this material is by unrolling the sheet of plastics material on which the elements are located, carrying this along a surface and causing the plastics material to be sharply bent over a corner and the elements fall therefrom. The plastics sheet can be returned beneath the surface and received onto a take up roll 67.

Alternatively, the elements may be cut by knives from a web of material. In this latter case, it is preferred that the cutting be effected away from contact with sand as any sand particles could blunt the cutting knives.

Also, the actual mixing could take place in different ways but we prefer to use mixing ladders 66 which are located subsequent to a delivery conveyor 65 in the area in which the re-enforcing elements are delivered so that the sand and elements are worked to ensure even mixing.

The mixture of sand with mesh elements is then returned directly into the hopper 11, the matrix passes through the paver, as described above, to leave a final profile which is effectively identical to the initial profile but with the upper layer comprising the matrix.

The method of mixing of the matrix can take forms other than that illustrated.

In one of these, a conveyor similar to that illustrated as conveyor 65 runs beneath the main conveyor in the opposite direction, and onto which conveyor 65, the sand and the reinforcing material are delivered.

This mixture is carried forward, in the direction of movement of the paver and, again at the end of this conveyor 65, which runs at effectively the same speed as the main conveyor 62, there is third conveyor (not illustrated in FIG. 4) onto which the mixture drops and this causes further mixing and the mixture is again carried rearwardly.

If required, and depending upon the degree of mixing, a further pair of similar conveyors could be located beneath or behind this conveyor.

The material delivered from the last conveyor is then fed into the hopper of the paver.

It is preferred that the mesh and the sand are delivered to a conveyor belt effectively together, as the mesh can then be delivered without being in substantial contact with other pieces of mesh and to a large degree preventing such contact. The reason for this is that the mesh elements tend to bind together if they are left in contact for any period.

If fibrous material is being used, depending upon the form of the material, it may be preferred that this either be placed on the belt prior to the sand or again at the same time as the sand.

Also, after the material has been added to the sand, and it will be appreciated that the material can be accurately metered to ensure that the correct quantity is delivered with the correct quantity of sand, it could pass from the second conveyor belt into a mixing drum which would be mounted therebelow or therebeside which drum is an open cylindrical drum having a substantially horizontal axis about which it rotates and the drum may have flights or paddles along its length to ensure the homogeneous mixing of the sand and the reinforcing material.

The delivery rate of the material along the surface, if it is obtained from rolls, or the speed of tile web, if it is being cut, can be used to ensure accurate metering.

If required, we can add peat moss or other material in the mixing stage.

Also, if required, the material, if being milled can be projected from the mill and very good mixing can be achieved.

In either case, the volumetric quantity of the soil fed to the hopper is substantially the same as that taken from the surface, so it will effectively be capable of providing a required surface which may be slightly higher than that of the material removed, because of bulking by the reinforcing material. In this case, the original profile can deliberately by lower than the required finished profile by an amount which can be estimated, depending on the amount of elements to be added.

In this form of the apparatus the actual depth of cut can be accurately maintained by various known methods of controlling cutting blades of this general type, and specifically by using laser control as is known in the art.

It is also preferred that, the free edge, that is the edge where soil has not yet been removed, of the blade has an upwardly and outwardly directed wing or the like somewhat similar to a mould board plough. This enables the matrix, when later being located in the areas to be correctly formed.

In a second modification of the machine, we can provide a turf delivery system at the rear of the machine so that turf is automatically laid by the machine as it moves forward, and this is illustrated schematically in FIG. 4.

The turf used in this type of application is washed turf which can be provided in rolls of required widths, and, in this case, the required widths would be the width of the paving.

The turf can be adapted to be delivered from the roll 70 as the machine moves forwardly and a roller or the like 71 can be placed on the top of the turf as it is delivered to ensure that it is maintained in the correct position.

If required, we could also provide a top dressing hopper 72 rearwardly of the delivery means which could deliver sand, or a mixture of sand and fertilizer or the like, to the upper surface of the turf as it is laid. This serves not only as a top dressing, but also to maintain the turf in its required position until its roots enter the sand/element matrix upon which the turf is laid and, at the same time assists in the holding of moisture while the turf is establishing.

We may also provide for use with the paver previously described, a machine to deliver material into the hopper thereof. This is illustrated in FIG. 5.

We have already stated that there will be a necessity of substantial quantities of material and that it was desirable to maintain the paver in movement as far as possible.

We have manufactured one particular form of delivery machine which comprises basically a hopper 80 through which there can pass a belt 81, which may be a ribbed belt. As mentioned before, the mixed material can be rather difficult to handle and this can pass through a moveable door 82 at one end of the hopper, which can act both to maintain the contents of the hopper and, to a degree, control the delivery rate. This belt can feed the mixture onto a flexible belt 83 which extends outwardly thereof which can initially be curved, but can flatten towards its outer end at which there may be a chute or the like whereby the material passing from this belt can be physically directed into the hopper 11 of the paver.

The hopper 80 of the delivery machine is connected to running gear 84 by means of a turntable 85 and this can provide two basic purposes.

The running gear itself may preferably include a number of wheels with wide tires and, preferably, there may be wheels on two adjacent axles so that the tires from one axle overlap with those of the other axle so, as the device moves over the already laid material delivered by the paver or turf which has freshly been laid thereon, it will act as an effective roller therefor and do no damage thereto.

The turntable 85 permits the hopper and the delivery belt to be normally longitudinal of the direction of movement, when the device is being towed, and thus it can meet normal towing requirements and, for example, pass through standard gates.

The delivery conveyor and its sub-frame can be pivotally connected to the main frame and be provided with a hydraulic ram so that under normal use circumstances, it can be raised to minimize the overall length of the device.

More importantly, the turn table permits the hopper and its conveyers to lie transversely to the direction of movement which is essential when the device is being moved along beside the paver and is delivering material thereto. In this case, the delivery conveyor 83 has to extend from the required side of the device, and if the paver is working an up and back system then, in one direction, it will have to deliver from one side, and in the other, from the other side. Under these circumstances, the conveyor is directed towards the paver, its angle is adjusted by use of the hydraulic rain so that it can terminate just above the hopper and delivery is effected.

Once the hopper 80 of the delivery machine is empty, and it will normally carry much more material than can be carried in the hopper 11 of the paver, then it is simply towed away for refilling and its place is taken by another, loaded, filling machine.

In this way, we can ensure continuous loading of the hopper 11 of the paver so that a maximum area can be covered in any particular time, The turntable 85 can be operated manually, and be able to be held at various positions by locks, which can automatically drop in when the position is reached, or could be operated mechanically by the provision of a ring gear or the like thereon having a pinion which could be operated by a hydraulic motor to effect the operation.

As the device will normally be towed by a tractor or the like, the hydraulic power can be taken from the power take off or, alternatively, there could be an independent motor on the device which provides the necessary power. It is preferred that the control of the device can be effected by the driver of the prime mover.

Rather than to have the filling machine towed, as mentioned above, we can have the device self-propelled by associating it with a truck chassis.

In this specification, we have discussed various types of equipment which are adapted to be used in the preparation of surfaces for laying of turf, in certain areas we have discussed variations in these and it will be appreciated there may be many other further variations without departing from the spirit and scope of the invention.

For example, the mixing machine discussed could be used separate from the paver to provide a sand/element matrix for use, say with the delivery machines discussed. In this case, sand is delivered to the first conveyor in a conventional manner, such as by having a delivery hopper which is filled by a front end loader or the like.

We claim:

1. An apparatus for laying an even depth of sand or a sand and reinforcement matrix onto a prepared surface for providing a base on which turf is to be laid, said apparatus comprising:

a hopper located on a frame having forward ground wheels for steering said apparatus and rearward ground wheels, said rearward ground wheels being in contact with a ground surface when said apparatus is being transported, but out of contact with the ground surface when said apparatus is being used, said hopper having means for receiving and holding the sand or sand and reinforcement matrix to be laid, a lower end of said hopper being able to be closed;

a plunger at a forward end of said hopper, said forward end being the direction of movement of said apparatus, and means for moving said plunger between a forward position and a rearward position, when said plunger is moved to said forward position, a lower end of said hopper is opened and the sand or sand and reinforcement matrix is able to pass to the ground surface forwardly of said plunger, whereas movement of said plunger to said rearward position causes the sand or sand and reinforcement matrix to be taken from said hopper and delivered through an extrusion aperture in a rearward portion of said hopper to an extrusion mold, and with movement to said forward position permitting further sand or sand and reinforcement matrix to pass to the ground surface rearwardly of said plunger before said plunger is again moved rearwardly, extrusion being effected by said apparatus moving forwardly as pressure is applied to the sand or sand and reinforcement matrix to be extruded and the extrusion mold passes over the sand or sand and reinforcement matrix; and, means for closing the lower end of said hopper and for bringing said rearward ground wheels into contact with the ground surface for when said apparatus is to be transported.

2. The apparatus as claimed in claim 1, wherein the hopper has a moveable door through which the sand or sand and reinforcement matrix passes, the moveable door moving with the plunger so that as the plunger moves to extrude the sand or sand and reinforcement matrix, the moveable door is opened and when the plunger moves in the opposite sense, the moveable door closes.

3. The apparatus as claimed in claim 1, further comprising a secondary hopper so that any unevennesses in the surface of said sand or sand and reinforcement matrix extruded is able to be removed by adding sand or other material thereto as said sand or sand and reinforcement matrix is about to leave the apparatus.

4. The apparatus as claimed in claim 3, wherein the secondary hopper has a door capable of being selectively be closed.

5. The apparatus as claimed in claim 1, further comprising means for removing a material from a previously prepared surface, the material is able to be mixed with a reinforcing material and a matrix of the material and the reinforcing material is then fed to the hopper for re-delivery to the surface.

6. The apparatus as claimed in claim 5, wherein said reinforcing material is provided in a web, there being cutting means whereby said web is cut into elements of a required size shortly before said elements are added to a sand to form said sand and reinforcement matrix.

7. The apparatus as claimed in claim 1, further comprising means for holding turf to be laid, said means for holding being located at a rearward portion of said apparatus and being able to hold a roll of turf.

8. The apparatus as claimed in claim 7, further comprising means for providing a top dressing over the turf as the turf is delivered.

9. The apparatus as claimed in claim 1, wherein said forward ground wheels are rollers, said rollers being steerable for controlling the direction of movement of the apparatus.

10. An apparatus for laying a sand or a sand and reinforcement matrix onto a prepared surface, said apparatus comprising:

a hopper for providing a sand and sand or reinforcement matrix to be laid;

a plunger at a forward end of said hopper, said forward end being the direction of movement of said apparatus, said hopper having a moveable door through which the sand or sand and reinforcement matrix passes, said moveable door moving with said plunger, so that as said plunger moves to extrude the sand or sand and reinforcement matrix, the moveable door is opened and when said plunger moves in the opposite sense, the moveable door closes; and, means for reciprocating said plunger for taking said sand or sand and reinforcement material from said hopper and delivering said sand or sand and reinforcement matrix through an extrusion aperture to an extrusion mold, the extrusion being effected by said apparatus moving forwardly as pressure is applied to the sand or sand and reinforcement matrix to be extruded and the extrusion mold passes over the sand or sand and reinforcement matrix.

* * * * *